US007031567B2

(12) United States Patent
Grinderslev et al.

(10) Patent No.: US 7,031,567 B2
(45) Date of Patent: Apr. 18, 2006

(54) EXPANDED BEAM CONNECTOR SYSTEM

(75) Inventors: Soren Grinderslev, Hummelstown, PA (US); Randy Marshall Manning, Lemoyne, PA (US); James David Kevern, Wellsville, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 10/484,949

(22) PCT Filed: Jul. 24, 2002

(86) PCT No.: PCT/US02/23700

§ 371 (c)(1),
(2), (4) Date: Jan. 26, 2004

(87) PCT Pub. No.: WO03/010564

PCT Pub. Date: Feb. 6, 2003

(65) Prior Publication Data

US 2004/0175073 A1 Sep. 9, 2004

Related U.S. Application Data

(60) Provisional application No. 60/365,646, filed on Mar. 19, 2002, provisional application No. 60/307,684, filed on Jul. 24, 2001.

(51) Int. Cl.
*G02B 6/32* (2006.01)

(52) U.S. Cl. .......................................... 385/34; 385/74
(58) Field of Classification Search ................ 385/34, 385/50, 71–74, 85; 65/61, 387, 406
See application file for complete search history.

(56) References Cited

U.S. PATENT DOCUMENTS

| 4,701,011 A | 10/1987 | Emkey et al. ........... 350/96.18 |
| 5,163,107 A | 11/1992 | Garriss ........................ 385/74 |

(Continued)

FOREIGN PATENT DOCUMENTS

| EP | 0 348 117 | 5/1995 | ...................... 6/32 |

(Continued)

OTHER PUBLICATIONS

Copy of Search Report from International Application No. PCT/US02/23700.
Nicia A: "Lens Coupling in Fiber-Optic Devices: Efficiency Limits"Applied Optics, vol. 20, No. 18, Sep. 15, 1981, pp. 3136-3143.

(Continued)

*Primary Examiner*—Kaveh Kianni
*Assistant Examiner*—Derek L. Dupuis

(57) ABSTRACT

A method of coupling a high-power optical signal between an optical fiber and a mating optical component, the optical signal ranging in wavelength from x to y, and having a first diameter while propagating in a mode field within the fiber, the method comprising: (a) converting the high-power optical signal between the first diameter in the fiber and a second diameter significantly greater than the first diameter using a GRIN lens fused to an end of the fiber, the GRIN lens having a diameter substantially the same as that of the optical fiber and a length l complying with the following equation:

$$\tfrac{1}{4}x + \tfrac{1}{2}nx \leq l \leq \tfrac{1}{4}y + \tfrac{1}{2}ny,$$

wherein n=0, 1, 2, 3 . . . 100;
(b) establishing physical contact between the GRIN lens and a coupling surface of the mating optical component; and (c) while the high-power optical signal is at the second diameter, optically coupling it between the lens and the mating optical component.

36 Claims, 9 Drawing Sheets

U.S. PATENT DOCUMENTS

| | | | | |
|---|---|---|---|---|
| 5,594,825 | A | 1/1997 | Kawasaki et al. | 385/60 |
| 5,694,506 | A | 12/1997 | Kobayashi et al. | 385/60 |
| 5,701,375 | A | 12/1997 | Duck et al. | 925/74 |
| 5,719,973 | A | 2/1998 | Monroe et al. | 385/34 |
| 5,996,376 | A * | 12/1999 | Johnson et al. | 65/406 |
| 6,263,133 | B1 | 7/2001 | Hamm | 385/33 |
| 6,471,417 | B1 | 10/2002 | Wang et al. | 385/72 |
| 2002/0150333 | A1* | 10/2002 | Reed et al. | 385/34 |
| 2002/0176644 | A1* | 11/2002 | Bhagavatula et al. | 385/11 |

FOREIGN PATENT DOCUMENTS

| | | | |
|---|---|---|---|
| EP | 0 933 659 | 8/1999 | 6/32 |
| WO | WO 02/056060 | 7/2002 | 6/3 |
| WO | WO 02/056060 A3 | 7/2002 | 6/38 |

OTHER PUBLICATIONS

Copy of Supplementary European Search Report from counterpart Application No. 02761177.1.

* cited by examiner

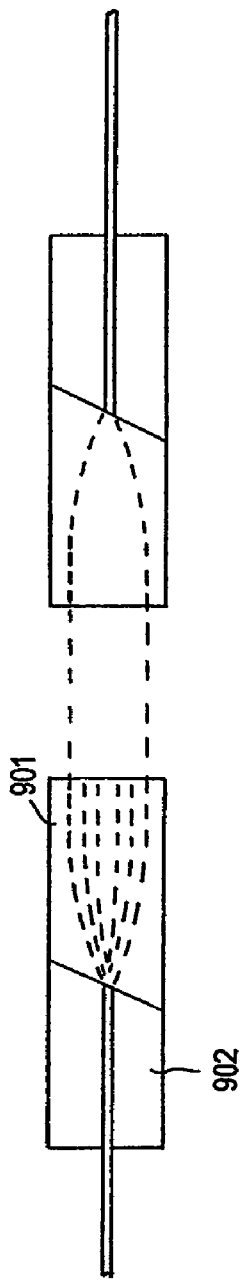
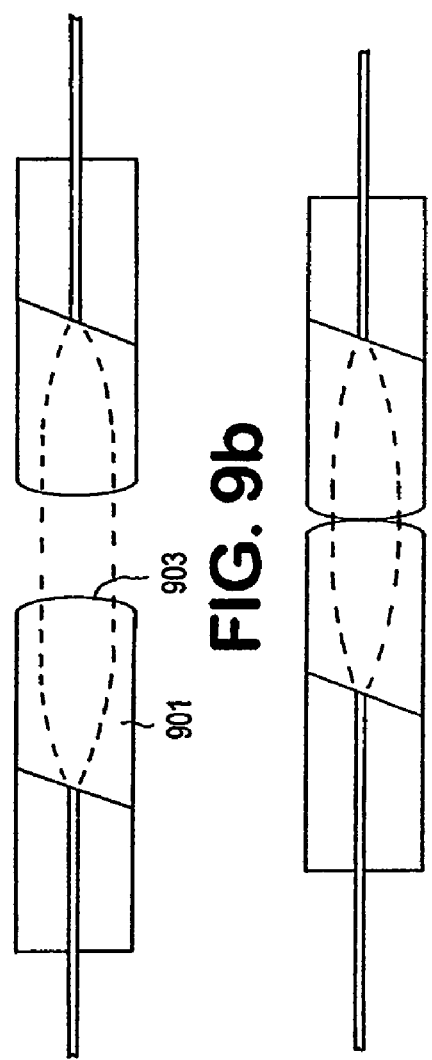
FIG. 9a
FIG. 9b
FIG. 9c

EXPANDED BEAM CONNECTOR SYSTEM

REFERENCE TO RELATED APPLICATIONS

This application claims priority to provisional application No. 60/307,684 filed Jul. 24, 2001 and provisional application No. 60/365,646 filed Mar. 19, 2002. Both of these applications are incorporated herein by reference including their appendices and any references which they incorporated by reference.

BACKGROUND OF INVENTION

There is a continuing need to reduce the number of optical amplifiers used in tele- and data-communication systems, and to increase the size of such systems. This need is best addressed by increasing the optical signal strength carried on the optical fibers. Conventional optical connectors, however, are limited in the signal strength that they can carry. Specifically, conventional connectors, especially those used in single mode applications, are incapable of supporting power transmissions at the level of about 1–3 watts. At these levels, surface anomalies and contamination at the interface of the fiber cores will cause immediate failures in the form of fusion and catastrophic destruction of the fiber core. Therefore, there is a need to accommodate high power transmissions while avoiding these failure modes resulting from practically unavoidable surface anomalies and debris at the interface of fiber cores.

SUMMARY OF INVENTION

The present invention avoids the aforementioned failure modes by reducing the power density of the signal transmission through beam expansion between the emitting and receiving fibers.

One aspect of the present invention is to provide an optical coupling system suitable for high power applications by expanding the beam. By expanding the beam, power density at the interface of the optical components is reduced. For example, by expanding the beam from a core size of about 10.4 microns to an expanded beam size of about 66 microns, the power density will be reduced by a factor of 40 (i.e., $(66/10.4)^2$).

In a preferred embodiment, the present invention provides for a method of coupling a high-power optical signal between an optical fiber and a mating optical component, the optical signal having a first diameter while propagating in a mode field within the fiber, the method comprising: (a) converting the high-power optical signal between the first diameter in the fiber and a second diameter using a collimator optically coupled to the fiber, the second diameter being significantly greater than the first diameter, and (b) while the high-power optical signal is at the second diameter, optically coupling it between the lens and the mating optical component.

Another aspect of the invention is to provide an optical coupling system having enhanced performance by expanding the beam. It has been found that the connector of the present invention has low loss and low back reflection performance at levels not previously achieved using conventional expanded beam connectors. In a conventional expanded beam connector, such as the Tyco Electronics IFE connector, the theoretical minimal loss can be no less than 0.40 dB. This is attributable solely to the Fresnel loss (reflection) and neglects any loss contributions arising from mechanical misalignment. In addition, the many interfaces with refractive index steps yield an unacceptable back reflection level for telecom applications. By expanding the beam area, however, a trade-off is introduced, between less loss sensitivity to lateral offset and increased loss sensitivity to angular offset.

In a preferred embodiment, the present invention provides a method of coupling an optical signal propagating in an optical fiber with a mating optical component, said optical signal having a first diameter while propagating in a mode field within the fiber, the method comprising the steps of: (a) expanding the optical signal from the first diameter to a second diameter, the second diameter being significantly greater than the first diameter, and (b) while the optical signal is expanded to the second diameter, coupling it to the mating optical component such that the insertion loss of the coupling is less than 0.3 dB and the back reflection at the coupling is less than −50 dB for an endface geometry with a straight symmetric contact region. A slant asymmetric contact region will yield <−65 dB backreflection, which is required in some applications.

Yet another aspect of the present invention is a connector system which couples the expanded beam using physical contact. In the prior art many expanded beam connectors require anti-reflective coatings to reduce Fresnel loss and reflection due to different refractive indexes at the many air/glass and glass/air interfaces of the system. Physical contact between glass surfaces which have close refractive indexes, reduces Fresnel losses and reflection without the need for anti-reflective coatings. To this end, in a preferred embodiment, the lens is fused to the fiber and polished to a desired end-face geometry to provide for physical contact. This way, the number of optical interfaces (refractive index changes) relative to a standard fiber optic expanded beam system is reduced significantly.

In a preferred embodiment, the connector of the present invention uses a graded index (GRIN) lens. The ability of a GRIN lens to form or focus the image of an object does not depend on its thickness as it is the case for conventional lenses. Rather, a GRIN lens is made with a refractive index that varies parabolically as a function of the radius, thus causing a periodic sinusoidal path of an incident ray along the length of the lens. Depending on this length, the surfaces of a like pair of GRIN lenses can therefore be matched physically to eliminate the air to glass interfaces causing Fresnel loss and reflection.

Still another aspect of the present invention is an expanded-beam connector system in which the lens and the fiber are similarly dimensioned such that they can be disposed in a common ferrule bore. In a preferred embodiment, the lens is cylindrical and has the same outside diameter as the fibers outside diameter. By fusing a lens and fiber having the same diameter, the compact assembly is able to fit into all kinds of fiber cavities with standard 125 µm holes, for example, single fiber ferrules or multiple fiber arrays with center line distances down to 250 µm.

In a preferred embodiment, the lens is a GRIN lens. Using a GRIN lens allows the ferrule to be polished in a conventional fashion to produce conventional end face geometries such as straight, flat, curved or slant configurations. In other words, since the GRIN lens using a graded refractive index to focus/expand the light beam and not a curved interface as in traditional lenses, it can be polished (i.e., truncated) without diminishing its focusing/expanding properties, providing that the length is kept at ¼ pitch+½n pitch, n= 0,1,2,3, . . . , where a pitch equals the length of one sinusoidal cycle of the optical signal in the lens material at a given frequency.

In a preferred embodiment, the GRIN lens has a diameter similar to that of the fiber and is fused to the fiber as an axial extension. For small beam expansions, the process utilizes only a mechanical diametrical alignment. For larger beam expansions, where loss sensitivity to angular alignment is prevalent, it is necessary to apply optical alignment in order to obtain satisfactory performance.

By incorporating or fusing the lens to the fiber in using a lens which is dimensioned similarly to a fiber, standard ferrules may be used and thus standard connector packages can be used (e.g., FC, SC, ST, LC, MU, Lightray MPX interconnect system, MPO, etc.).

Aside from lending itself to standard connector packages, by fusing a similarly dimensioned lens to a fiber, no additional lateral space is required for the lens and thus the center-to-center distance of a multi-fiber cable need not be disturbed. Therefore, such an embodiment is particularly preferred in preparing ribbon cables for optical connection.

Another aspect of the invention is a method of manufacturing the expanded beam connector system in which the lens and fiber are of the same diameter and thereby eliminate the need to align the lens and the fiber.

In a preferred embodiment, the method of manufacturing a cable assembly, said method comprising the steps of: (a) fusing a GRIN lens to an end of a fiber, said GRIN lens having a certain pitch for a given wavelength transmission, said GRIN lens having essentially the same diameter as said fiber, (b) fusing said lens to said fiber without using active alignment; (c) inserting said fiber with said lens fused thereto into a ferrule borehole such that an end surface of said GRIN lens is substantially planar with an end face of said ferrule; and (d) polishing said ferrule and said GRIN lens until the desired end face geometry and finish is achieved.

BRIEF DESCRIPTION OF DRAWINGS

FIGS. 9a–9c shows an alternative preferred embodiments of the connector system of the present invention in which the collimator is adjacent a fiber-containing ferrule;

DETAILED DESCRIPTION OF PREFERRED EMBODIMENTS

The present invention provides for an expanded beam connector system to ensure reliable and repeatable optical coupling between the fiber(s) of a connector and the optical pathway(s) of a mating optical structure. The term "optical pathway," as used herein, refers to any medium for conducting optical signals including the following: a fiber or waveguide; a silica-based or polymeric structure in a substrate; or a silica-based or polymeric optical component. The term "mating component" refers to an optical package that contains or comprises the optical pathway. For example, a mating component may be another connector, herein a "mating connector" or it may be an optical device in which the optical pathway is an integral component. Examples of optical devices include passive devices, such as, add/drop filters, arrayed waveguide gratings (AWGs), splitters/couplers, and attenuators, and active devices, such as, optical amplifiers, transmitters, receivers and transceivers.

Figure 1A:
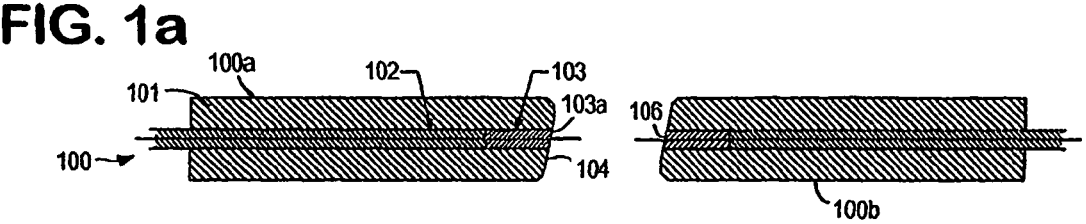
FIGS. 1a and 1b show a preferred embodiment of the connector system of the present invention in an unmated and mated state, respectively.
Figure 1B:

Referring to FIGS. 1a and 1b, a preferred embodiment of the connector system 100 of the present invention is shown. FIG. 1a shows a cable assembly 100a for optical coupling to a mating component 100b, in this case, another cable assembly 100b. The cable assemblies, as illustrated, are identical, and, thus, the discussion herein will be limited to just connector component 100a The connector component 100a comprises a ferrule 101 containing a fiber 102 and a collimator 103 optically coupled to the fiber 102. FIG. 1b shows the optical assemblies 100a, 100b in a mated condition. To this end, a sleeve 105 is used in this particular embodiment to maintain proper axial alignment of the expanded beam, although it should be understood that any known alignment approach can be used with the present invention including, for example, alignment pins as used in MT-type ferrules. In the mated condition, a coupling surface 103a of the collimator is optically coupled to a corresponding coupling surface 106 on the mating component 100b.

The fiber 102 can be either a single mode or a multimode fiber, although it is anticipated that a single mode fiber will be preferred for high power and high performance applications in which the connector system of the present invention is likely to be used. As is well known, the fiber transmits an optical signal in a mode field having a diameter which is referred to herein as the "first diameter." For example, a wavelength of about 1310 nm has a first diameter of about 9.2 μm, while a wavelength of about 1550 nm has a first diameter of about 10.4 μm.

The collimator 103 functions either to expand the optical signal from the first diameter as it leaves the fiber 102 to a second diameter or to focus the optical signal from the second diameter to the first diameter for coupling to the fiber. The second diameter is considerably larger than the first diameter. In a preferred embodiment, the ratio of the first diameter to the second diameter is about 1:2.5 to about 1:10, more preferably about 1:5 to about 1:10, and even more preferably about 1:6.4. In a preferred embodiment, the second diameter of the collimated beam is greater than about 20 μm, more preferably, about 30 to about 100 μm, and, even more preferably, about 45 to about 70 μm.

The collimator can be any known device for expanding/focusing light including, for example, a lens or an expanded core of a fiber, in particular, a thermally-expanded core. Preferably, the collimator is a lens, and, more preferably, it is a GRIN lens. Also in a preferred embodiment, the fiber 102 is fused to the collimator 103 to minimize Fresnel losses or reflective losses.

To achieve the desired second diameter, the length of the GRIN lens needs to be tailored to the pitch (or wavelength) of the optical signal at which the connector system is intended to be operated. Specifically, the length of the lens is dictated by the following formula Length=¼ pitch+½n pitch wherein n=0, 1, 2, . . . and pitch is the median wavelength at which the system will be used. For example, for an operating wavelength of 1600 nm, the desired GRIN lens length is 400 nm (n=0), 1200 nm (n=1), 2000 nm (n=2), 2800 nm (n=3), etc. Often a connector system must be suitable for operating over a range of operating frequences, such as 1300 nm to 1600 nm. In such a case, it is preferable for the lens to be dimensioned based on a median or average frequency. For example, if the connector is intended to operate within a range of wavelengths from x to y, the length of lens is governed by the following formula Length=¼(x+y)/2+½n(x+y)/2.

Preferably, n is between 3 and 100 to provide a GRIN lens which is miniature enough to be incorporated into small form factor connector designs, but which has sufficient length to facilitate handling. As discussed below, the proper GRIN lens length is established by fusing the lens to the fiber and then grinding or polishing the GRIN lens until it reaches its desired length. A GRIN lens having the desired performance criteria and dimensions is available from Light-Path Inc.

The connector system 100 shown in FIGS. 1a and 1b serves to couple an optical signal between the optical fiber 102 and the mating component, which, in this case, is a mating cable assembly 100b. To this end, the collimator 103 converts the optical signal between the first diameter in the fiber and a second diameter, and while the optical signal is at the second diameter, it is optically coupled between the collimator 103 and the mating component 100b. It has been found that optically coupling components when the optical signal is expanded improves performance and increases tolerance of debris or misalignment. This improved performance and tolerance is attributed to the reduction in the power density and the expansion in the beam diameter.

The principal function of the connector system of the present invention is to reduce power density at the interface of the cable assembly and the mating component. For example, by expanding the light from a core size of about 10.4 microns to an expanded beam size of about 66 microns, the power will be reduced by a factor of 40 (i.e., $(66/10.4)^2$). Table 1 below correlates beam expansion and power density. Specifically, different expanded beam sizes of 18.5, 47, and 66 microns are correlated with different powers to show allowed power transmission in watts.

TABLE 1

Beam Expansion v. Power Density

| Baseline power (Watts) | Gaussian peak power density (kW/sqcm) for baseline power | Expanded beam size (μm) | | |
|---|---|---|---|---|
| | | 18.5 | 47 | 66 |
| | | Allowable power transmission (Watts) | | |
| 0.025 | 59 | 0.079 | 0.511 | 1.007 |
| 0.040 | 94 | 0.127 | 0.817 | 1.611 |
| 0.075 | 177 | 0.237 | 1.532 | 3.021 |

TABLE 1-continued

Beam Expansion v. Power Density

| Baseline power (Watts) | Gaussian peak power density (kW/sqcm) for baseline power | Expanded beam size (μm) | | |
|---|---|---|---|---|
| | | 18.5 | 47 | 66 |
| | | Allowable power transmission (Watts) | | |
| 0.100 | 235 | 0.316 | 2.042 | 4.027 |
| 0.200 | 471 | 0.633 | 4.085 | 8.055 |
| 0.300 | 706 | 0.949 | 6.127 | 12.082 |
| 0.400 | 942 | 1.266 | 8.169 | 16.109 |
| 0.500 | 1,177 | 1.582 | 10.212 | 20.137 |
| 0.600 | 1,413 | 1.899 | 12.254 | 24.164 |
| 0.700 | 1,648 | 2.215 | 14.296 | 28.192 |
| 0.800 | 1,883 | 2.531 | 16.339 | 32.219 |
| 0.900 | 2,119 | 2.848 | 18.381 | 36.246 |
| 1.000 | 2,354 | 3.164 | 20.423 | 40.274 |

By reducing the power density, the risk of damage at the interface of optical components is minimized at higher power levels and transmittance performance is enhanced. As used herein, the term "high power" refers to an optical signal having an energy level higher than that of transmissions used in telecommunications which are typically below 50 mW continuous wave or pulsed. The connect system of the present invention is particularly well suited for high power transmissions, and, preferably, transmissions of 50 mW to about 3 W. Although particularly well suited for high power optical signals, the system can nevertheless operate over a wide range of transmission powers, such as signals ranging from 100 μW to 3+W CW.

The enhanced performance of the connector system of the present invention is evident in its low insertion loss and back reflection. In a preferred embodiment, the insertion loss at the interface between the collimator 103 and the coupling surface of the mating component is less than about 0.5 dB, and, more preferably, less than about 0.3 dB, while the back reflection at the interface is preferably less than −50 dB, and more preferably less than −65 dB if an angled physical contact (APC) geometry is used.

Figure 2:
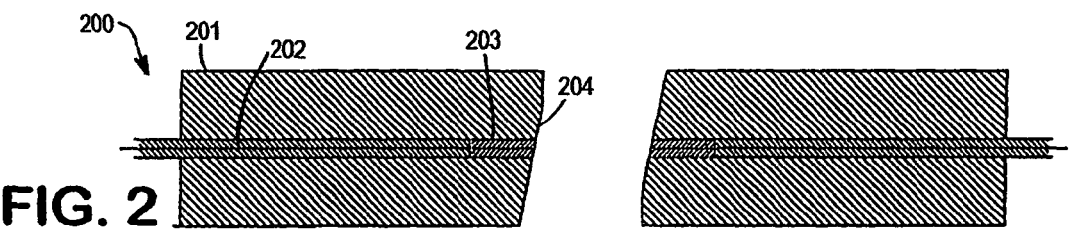
FIG. 2 shows a preferred embodiment of the connector system of the present invention in which the collimator and fiber are contained in a single-fiber MT-type ferrule.
Figure 3:
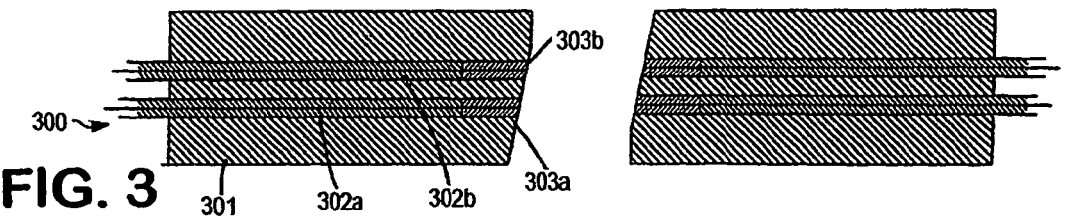
FIG. 3 shows a preferred embodiment of the connector system of the present invention in which the collimator and fiber are contained in a multi-fiber MT-type ferrule.

The embodiments shown in FIGS. 1–3 illustrate the connector components effecting an optical coupling through physical contact (PC). To effect physical contact, a contact load is applied to the lens (typically via a spring) to urge the lens forward (toward the mating connector) and deform the lens material at the point of contact with the mating connector to provide a spot size larger than that of the expanded beam size. Advantages of physical contact connectors over connectors involving an air space are well known in the art and will not be discussed in detail herein. Thus, in addition to its ability to accommodate high power transmission, the connector of the present invention also has excellent performance. For example, in a preferred embodiment, as mentioned above, the optical components provide less than 0.5 db insertion loss and no greater than −50 db back reflection.

Figure 4C:
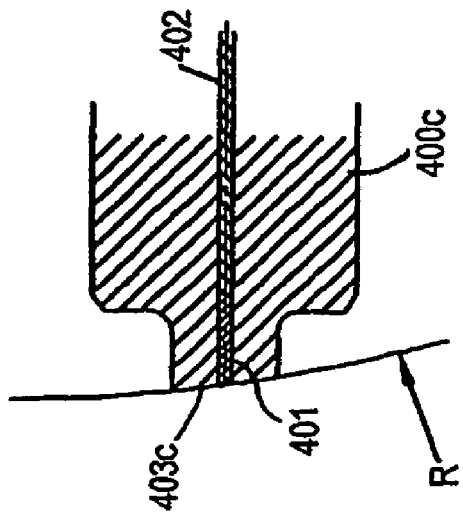
FIGS. 4a–4c show various end face geometries of a ferrule containing a collimator and fiber in accordance with the present invention.
Figure 4B:
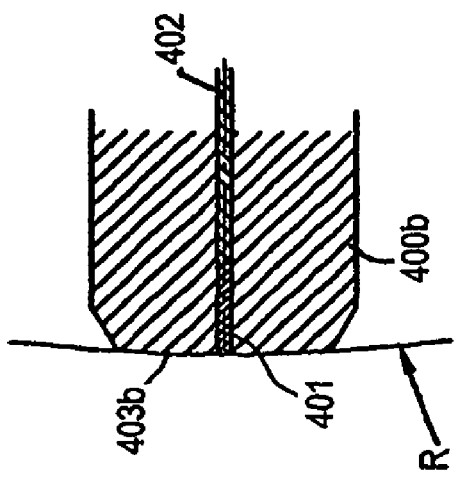
Figure 4A:
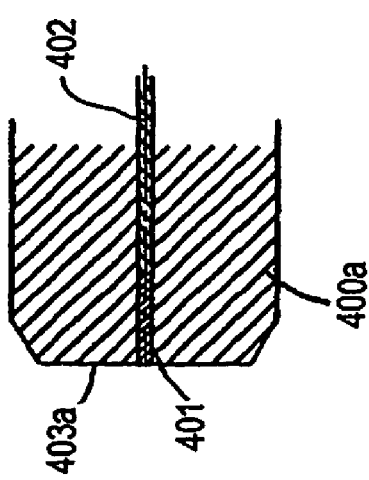

As mentioned above, the ferrule containing the GRIN lens can be polished using traditional techniques. Referring to FIG. 4, different end face configurations are shown. Specifically, FIG. 4a shows a ferrule 400a containing a fiber 402 and a GRIN lens 401 fused to the fiber 402. The end face 403a of the ferrule 400a is essentially flat. FIGS. 4b and 4c show alternative ferrule embodiments 400b and 400c having radiused end faces 403b and 403c, respectively. Specifically, end face 403b is polished to a dome having a radius of $R_b$ and is essentially perpendicular to the optical axis of the fiber 402 (i.e. PC polish), while end face 403c is polished to a dome having a radius of $R_c$ which is angled relative to the optical axis of the fiber 402 (i.e., APC polish) to minimize back reflection. The end face configurations of ferrules 400b and 400c are well known, and specified, for example, in the Telcordia GR-326-Core Specification.

Although physical contact between the optical components of the connector of the present invention is preferred, there may be applications in which the expanded beam concept of the present invention may be used with an air space between the connector components. For example, it may be desirable to avoid physical contact and to optically couple instead across an air gap in situations where vibration is excessive and would eventually compromise the physical contact between the optical components. Another situation may be found where the environment contains an inordinate amount of debris and that contamination of the interface of the GRIN lens is, for practical purposes, unavoidable. In such applications, using an expanded beam connector of the present invention may be preferably simply to minimize the effects debris may have on the optical signal being transmitted.

Figure 5:
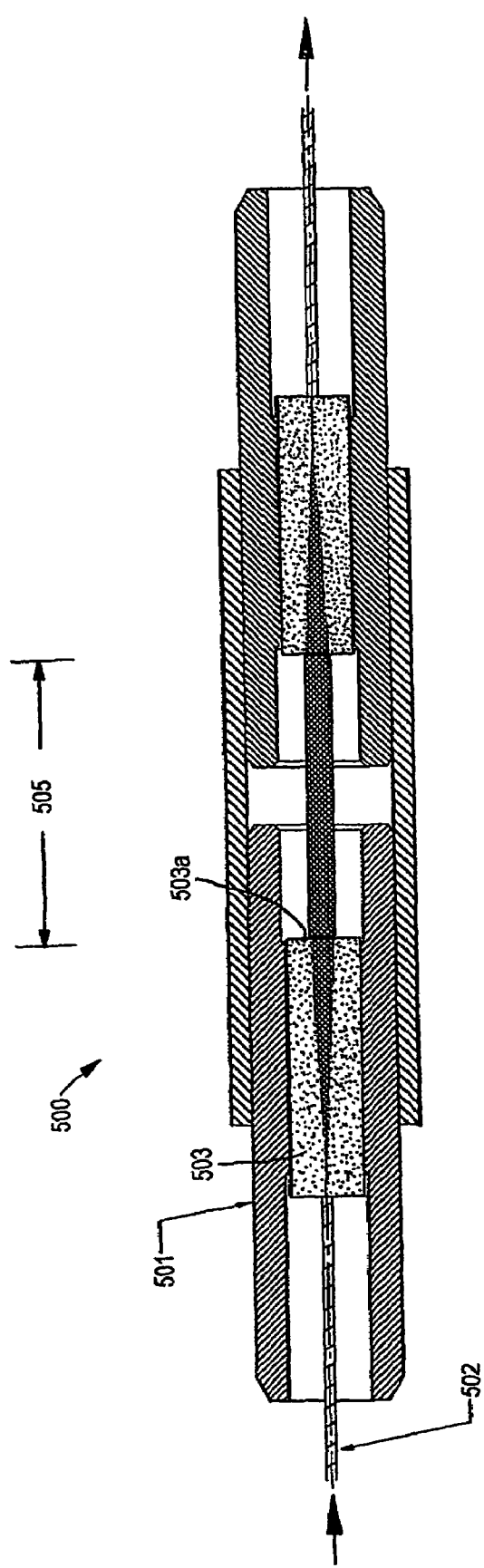
FIG. 5 shows an alternative preferred embodiment of the connector system of the present invention which provides for an air gap between the cable assemblies.

Referring to FIG. 5, a connector 500 is shown having a ferrule 501 and GRIN lens 503, which optically couples to a similar connector across an air gap 505. In this embodiment, a GRIN lens 503 having an outside diameter much greater than the fiber 502 is shown, although it should be understood that the embodiment shown in FIG. 1 in which the lens is similarly dimensioned to the fiber could be used instead. For connector systems configured to provide an air gap, it is preferred that the coupling surface 503a be coated with an anti-reflective coating. Such coatings are well known in the arL In a preferred embodiment, the lens is a GRIN lens which is fused to the fiber and has an outside diameter substantially equal to the outside diameter of fiber which is typically about 125 μm. Again, suitable GRIN lenses having the requisite dimensions are available from LightPath Inc.

A configuration in which the GRIN lens has a diameter similar to that of the fiber has a number of significant advantages. First, such a design facilitates incorporating the ferrule/GRIN lens assembly into existing connector housings. That is, the GRIN lens can be inserted into a common ferrule dimensioned to receive a standard optical fiber. Since the ferrule/GRIN lens assembly is inserted into a common ferrule, the dimensions and outside configuration of the ferrule remain unchanged, allowing the ferrule to be incorporated into any traditional or later-developed connector housing.

Figure 6:
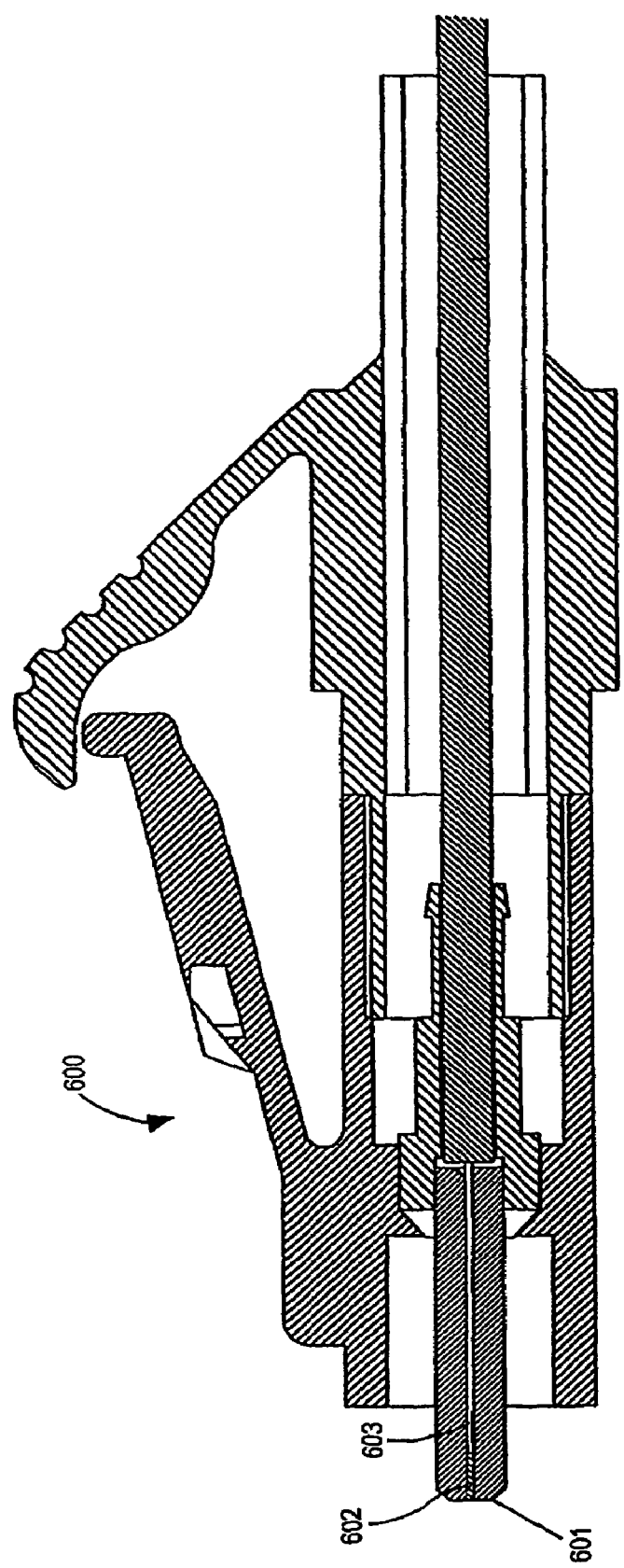
FIG. 6 shows a preferred embodiment of the connector system of the present invention in an LC-type connector housing.
Figure 7:
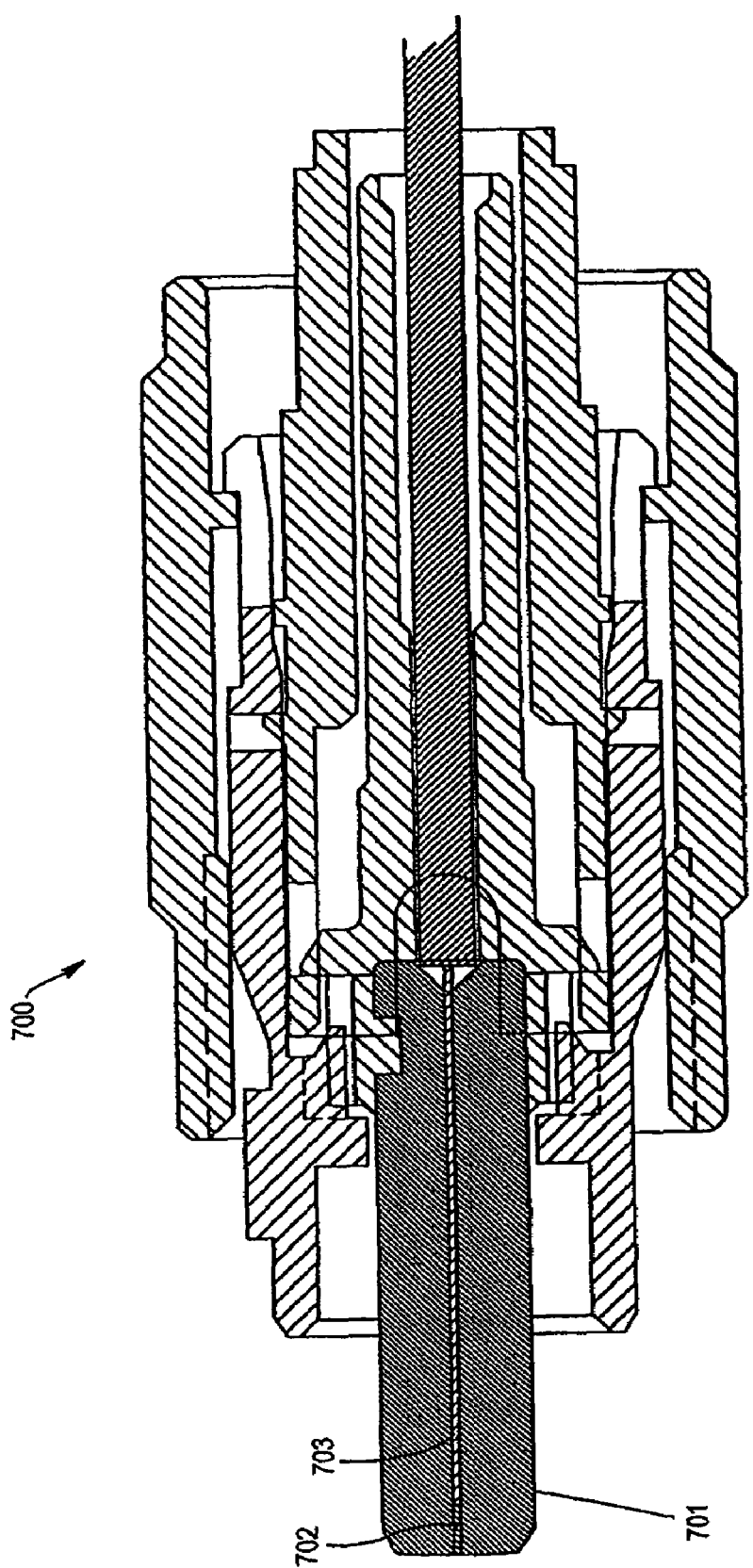
FIG. 7 shows a preferred embodiment of the connector system of the present invention in an FC-type connector housing.
Figure 8:
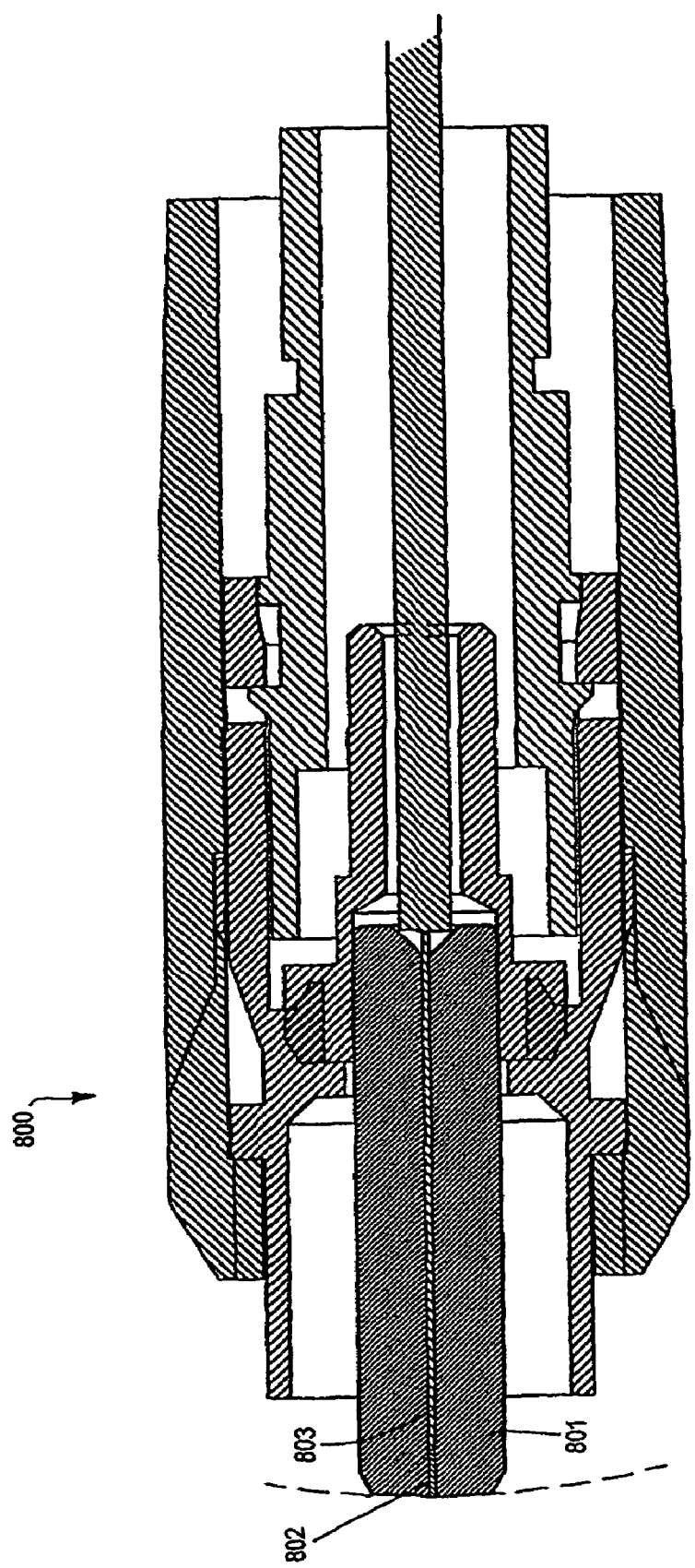
FIG. 8 shows a preferred embodiment of the connector system of the present invention in an SC-type connector housing.

For example, in FIG. 6, an LC-style connector 600 is shown with the fiber/GRIN lens assembly of the present invention. Specifically, LC-style connector 600 comprises a ferrule 601 containing a GRIN lens 602 fused to a fiber 603. As the figure illustrates, the GRIN lens is the same diameter as the fiber and is inserted in the ferrule's bore hole just as a fiber would be. In FIGS. 7 and 8, expanded beam connectors 700, 800 of the present invention are shown in an FC-style and SC-style, respectively. Again, in this embodiment, a micro-collimator GRIN lens 701, 801 is fused with the single mode fiber 702, 802, respectively. The grin lens and the ferrule are then polished to either a PC geometry (connector 700) or an APC geometry (connector 800).

In addition to facilitating packaging in existing connector ferrules and housings, the common diameter of the GRIN lens/fiber assembly facilitates its incorporation into dense fiber arrays which is particularly important in today's developing markets. The continuing need for miniaturization in the telecommunications field has given rise to the need to populate the backplane of host systems as densely as possible, hence the development of "small-form factor" designs for connectors and modules. Complicating the desire for small-form factor designs is a competing desire for increasing the number of fibers presented in a single optical connector. The industry is evolving from single fiber ferrules to multi-fiber ferrules containing two or more fibers arranged in an x,y array to accommodate ribbon. Therefore, the desire for small form factor designs combined with the desire for multi-fiber arrays has lead to high-density fiber array interfaces. As used herein, the term "fiber pitch" refers to distance between center lines of parallel fibers. The pitch of a high-density fiber array typically is about 250 μm to about 1 mm. Examples of commonly-used, high-density array interfaces include the MT-RJ type of connectors which have a single row of two or more fibers and the Lightray MPX™ line of connectors which have one or more rows of one or more fibers.

Since the diameter of the GRIN lens/fiber assembly is no larger than a standard optical fiber, it can be packaged as densely as fibers are packed. This renders the present invention particularly useful for high-density fiber array interfaces such as those used to terminate ribbon cable. In one embodiment, the connector of the present invention presents a fiber array having a pitch of no greater than about 2.5 mm, and, preferably, no greater than about 1 mm.

The ability of the connector of the present invention to facilitate high-density fiber arrays renders it particularly well suited for MT-style ferrule connectors which are well known as mentioned above. Referring to FIGS. 2 and 3, MT-style ferrule connectors are shown. Specifically, the connector system 200 comprises two single-fiber MT ferrules having a characteristic APC end face 204. As with the embodiment of FIG. 1, the ferrule 201 contains a fiber 202 fused to a collimator 203. Referring to FIG. 3, the connector system 300 comprises a multi-fiber ferrule MT style ferrule. Ferrule 301 contains the assembly of fibers 302a and 302b which are fused to lenses 303a and 303b, respectively. Although the connector of the present invention is only depicted herein as having two fibers, it should be understood that the present invention may be practiced with any known or later-developed MT ferrule having any number of fibers in its interface array since the collimator is no larger than the fiber.

Although it is preferred to hold the lens and fiber in a common ferrule when effecting the optical coupling through physical contact, it is not necessary and the GRIN lens itself may be used to effect physical contact. Referring to FIGS. 9a, 9b, and 9c various embodiments are shown which effect physical contact using GRIN lenses. In FIG. 9a a GRIN lens 901 is shown in a capillary arrangement with a ferrule 902. In FIG. 9b, the same arrangement as FIG. 9a is shown, however, the end face 903 of the GRIN lens 901 has a spherical geometry (PC polish). The diameter of the plane formed by the deformation of the surfaces of the lenses during physical contact is greater than the diameter of the collimated image. Forming a spherical surface on the end face of the lenses promotes deformation of the end face into a plane that is perpendicular to the collimated image. As is shown in FIG. 9c, when mating, spherical geometry provides for deformation and, therefore, improved physical contact.

Although the present invention has been depicted herein in various combinations with a ferrule, the present invention may be practiced with ferruleless connector systems as well. Suitable ferruleless systems include those disclosed in U.S. Patent No. U.S. Pat. No. 5,694,506, issued to Kobayashi et al., and herein incorporated by reference, and in PCT application no. PCT/US01/47694, which is assigned to the assignee of the present application, and which is herein incorporated by reference. Since the collimator is preferably the same diameter as the fiber, there is no dimensional difference between a bare fiber as used in the references and the collimator/fiber assembly of the present invention. Accordingly, the collimator/fiber assembly may be configured just as the bare fiber is treated in accordance with the teachings of both references.

The connector of the present invention not only provides for enhanced performance and high power capability, but also facilitates a relatively simple manufacturing process which does not require specialized equipment. In a preferred embodiment, the method of manufacturing comprises: (a) fusing a collimator to an end of a fiber, the collimator having essentially the same diameter as the fiber; (b) inserting the fiber with the lens fused thereto into a ferrule borehole such that an end surface of the collimator is substantially planar with an end face of the ferrule; and (c) polishing the ferrule and the collimator until the desired end face geometry and finish is achieved. If a GRIN lens is used as the collimator, then it needs to be polished such that its length from the end of the fiber to the ferrule surface is about ¼ pitch+½n pitch, n=0, 1, 2, 3 . . . as mentioned above. Since the collimator and fiber are the same diameter in the preferred embodiment, acceptable axial alignment of the fiber and lens can be achieved using passive alignment, although active alignment may be desirable to optimize transmittance.

Figure 10:
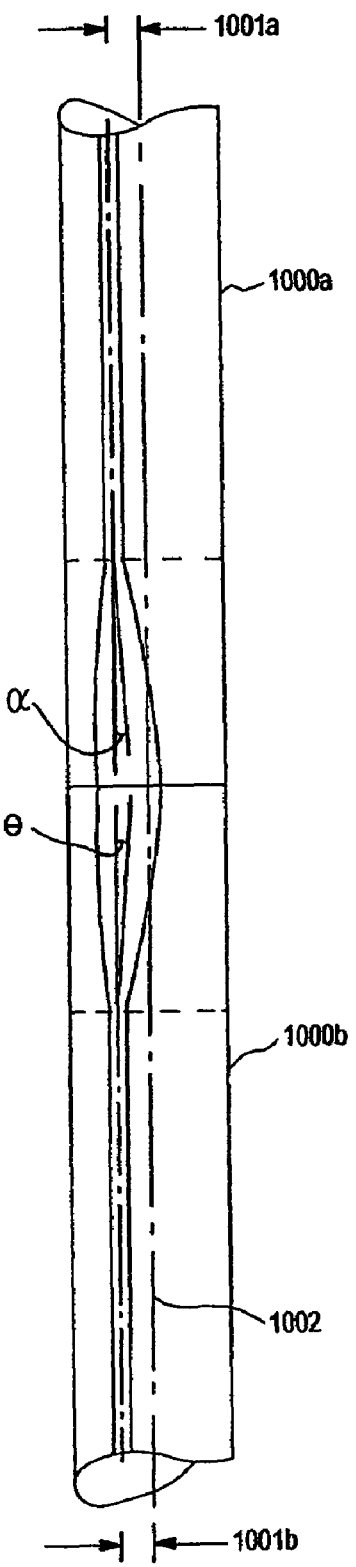
FIG. 10 illustrates a problem with offsets being on the same side of the centerline of the collimator.

Even with active alignment though, some degree of axial mismatch can be expected between the centerline of the fiber's core and the centerline of the collimator which results in the optical signal skewing in the collimator. This mismatch is referred to herein as "offset." Typically, the optical signal is skewed at an angle from the offset toward the center of the collimator. As shown in FIG. 10, if two connectors 1000a and 1000b are mated which have offsets 1001a and 1001a, respectively, on the same side of the collimator centerline 1002, the skew angles α and θ of the optical signals of each connector will be interfering and result in an angle of α+θ at the interface of the two connectors. Such an angle is likely to be a significant source of insertion loss and, thus, unacceptable.

Applicants have discovered, however, that radial positioning this offset can optimize optical coupling efficiency between connectors having offset. Specifically, by way of background, a connector typically contains some "key" to ensure that it mates in a certain radial position with respect to another connector. The term "key," as used herein, is any structure on the connector that facilitates polarization or radial alignment between connectors or between the connector and a mating structure. For example, a key may be a protrusion on a connector housing. There is a corresponding "keyway" on the mating structure. For example, a keyway may be a slot on an adapter. An adapter joining two connectors may have two keyways corresponding to keys on two mating connectors.

Figure 11A:
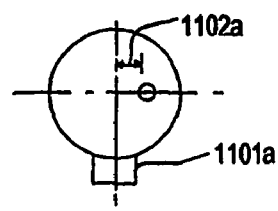
FIG. 11 illustrates a solution to the problem illustrated in FIG. 10.
Figure 11:
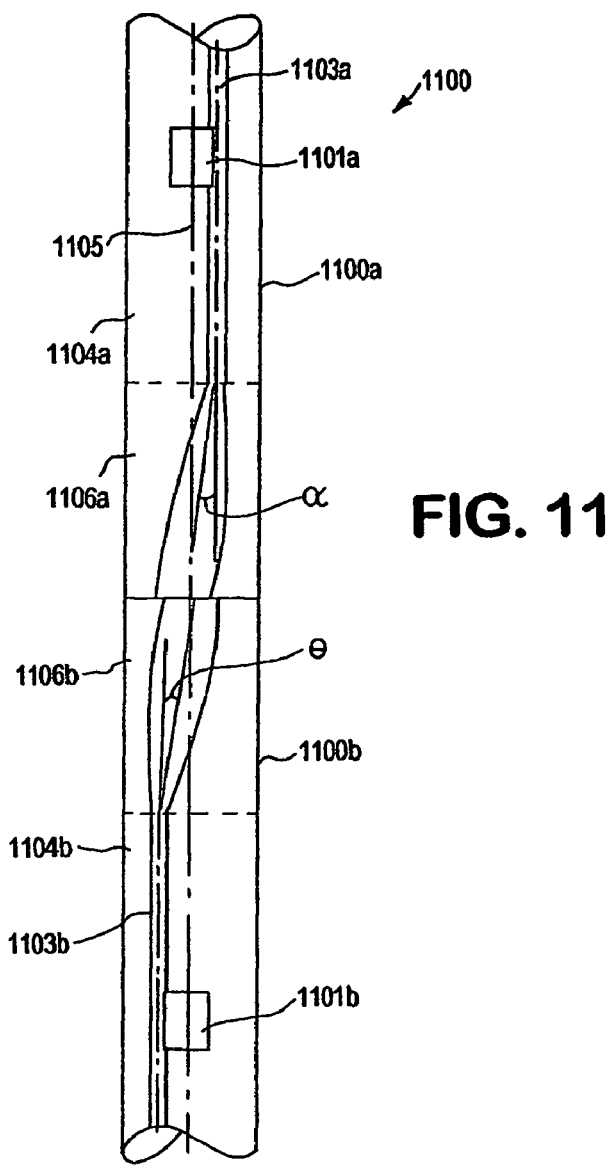
Figure 11B:
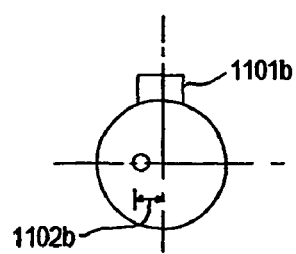

It has been found that if the offset is consistently positioned perpendicular to and on a particular side of the key, then the offsets in mating connectors will be somewhat compensated for one another. Specifically, referring to FIG. 11, a capillary-type connector system 1100 is shown having two identical halves 1100a, 1100b. Each half has a key 1101a, 1101b and a certain offset 1102a, 1102b, respectively. As shown in the schematic cross-sectional views of FIGS. 11a and 11b, in this embodiment, each core 1103a and 1103b of each fiber 1104a and 1104b is slightly off from center 1105. In both cases though, the offset is kept to the left and perpendicular to the key from the perspective of the key being on top. This convention allows any two connectors having offsets to mate in such a way that the skew angles α and θ of the optical signals in the collimators 1106a and 1106b are parallel to each other (see FIG. 11). This parallel arrangement of skew angles results in the angles being complementary, rather than interfering. Complementary angles tend to nullify one another. Thus, the optical signals are aligned with each other to the highest degree possible given their particular offsets.

By way of contrast, if the offset of both connectors were positioned either in alignment with the key or 180° out of phase with the key, then the skew angles would be interfering. Although the skew angles would be complementary if one connector had its offset aligned with the key while the other connector had its offset aligned 180° out of phase with the key, this arrangement is cumbersome and requires specific mating pairs. To overcome this problem, the keyways on opposite sides of the adapter can be place 180° out of phase as an alternative to positioning the offset perpendicular to and on a particular side of the key. Therefore, the approach of the present invention not only reduces the negative effects of offset, but also avoids the need for specific mating pairs.

EXAMPLE 1

The method of manufacturing the connectors of the present invention can vary. The following is an example of a preferred manufacturing approach for either an FC or SC style connector having the expanded beam of the present invention. It should be understood that this example is for illustrative purposes only and should not be used in any way to limit the scope of the invention.

Step 1. Receive lens/fiber pigtail from vendor
  SMF-28 fiber with 900 um buffer,
    length: 3 m
    from tip of lens to beginning of buffer: 11/10.5 mm
    lens length is ¼ pitch plus 17–22 µm for polishing
Step 2. Assembly
  Connector sub-assembly parts:
    Ferrule: SM-126/127 µm bore (larger bore more readily accepts lens/fiber pigtail than SM-125/126 µm bore ferrule)
    Ferrule assembly: FC or SC
    Spring: standard
    Retainer body: standard
  Epoxy: 353 ND, SM cure schedule
  Alignment and cure fixture with "non-stick" physical stop
  Cure Requirement: lens tip should be flush with ferrule tip within −1 to +3 µm
Step 3. Clean and inspect
  Residual cured epoxy will be present at ferrule/lens tip. Residue needs to be removed in order to inspect for (1) intact lens, (2) evaluate protrusion
  Equipment: Westover microscope with large magnification
  Compare to reference samples with protrusion measured on DORC Interferometer
  Mount protective cap
Step 4. Terminate equipment end
  Equipment end is terminated with an FC connector for ease of testing. (Standard polish).

Step 5. Polish
Equipment:
550 polisher with pneumatic load
Universal polishing plate
standard rubber pad
"Fine diamond" NNT film
Precision micrometer gauge, 1 μm resolution

| Time | Removal | Film usage |
| --- | --- | --- |
| 60 sec | 6–7 um | fresh "fine diamond film" 6–7 connectors plus 3 |
| 60 sec | 8–9 um | refs*. |
| 20 sec | 2 um | 2$^{nd}$ use of "fine diamond film" |
|  |  | 3$^{rd}$ use of "fine diamond film" |
| 100 sec | 0–1 um | Fresh NTT film |

*The removal rate is determined as an average before/after measurement of on the 3 dummy ferrules. Each step requires reset of all ferrules in fixture. Remove 20 um to be within: Nom +/−5 um. {or L(rem) = L(spec) + L(prot) − L(nom)}

Step 6. Test
Clean, inspect and measure IL and RL against a 'Master' quality launch lead at both 1310 nm and 1550 nm to verify IL<0.35 dB, BR<−50 dB Step 7. Connector choice
Snap on desired version of either FC or SC outer Housing.

What is claimed is:

1. A method of coupling a high-power optical signal between an optical fiber and a mating optical component, said optical signal ranging in wavelength from x to y, and having a first diameter while propagating in a mode field within said fiber, said method comprising:
converting said high-power optical signal between said first diameter in said fiber and a second diameter significantly greater than said first diameter using a GRIN lens fused to an end of the said fiber, said GRIN lens having a diameter substantially the same as that of said optical fiber and a length l complying with the following equation:

$$\tfrac{1}{4}x+\tfrac{1}{2}nx \leq l \leq \tfrac{1}{4}y+\tfrac{1}{2}ny,$$

wherein n=0, 1, 2, 3 . . . 100;
establishing physical contact at the interface of said GRIN lens and a coupling surface of said mating optical component; and
while said high-power optical signal is at said second diameter, optically coupling it between said GRIN lens and said mating optical component.

2. The method of claim 1, wherein converting the high-power optical signal from said first diameter to said second diameter reduces the power density of said high-power optical signal by a factor of about 6 to about 91.

3. The method of claim 2, wherein said factor is about 40.

4. The method of claim 1, wherein the power of said high-power optical signal is greater than 50 mW.

5. The method of claim 4, wherein the power of said high-power optical signal is about 50 mW to about 3 W.

6. The method of claim 1, wherein said length of lens is about ¼(x+y)/2+½n(x+y)/2, wherein n=0, 1, 2, 3 . . . 100.

7. The method of claim 1, wherein said high-power optical signal has a wavelength of about 1300 to about 1600 nm, a first diameter of about 9.2 to about 10.4 μm, and a second diameter of about 26 to about 100 μm.

8. The method of claim 7, wherein said high-power optical signal has a wavelength of about 1550 nm, a first diameter of about 10.4 μm, and a second diameter of about 75 μm.

9. The method of claim 1, wherein the ratio of said first diameter to said second diameter is about 1:2.5 to about 1:10.

10. The method of claim 9, wherein the ratio of said first diameter to said second diameter is about 1:6.4.

11. The method of claim 1, wherein the insertion loss at the interface between said lens and said coupling surface of said mating optical component is less than about 0.5 dB.

12. The method of claim 11, wherein the back reflection at the interface between said lens and said coupling surface of said mating optical component is less than −50 dB.

13. The method of claim 1, wherein said GRIN is continued within a ferrule, and said ferrule and GRIN lens are polished with an APC geometry and back reflection at the interface between said GRIN lens and said coupling surface of said mating optical component is less than −65 dB.

14. The method of claim 1, wherein said mating component is a second fiber, and said method further comprises converting said high-power optical signal between said first diameter in said second fiber and said second diameter using a second GRIN lens optically coupled to said second fiber.

15. The method of claim 14, wherein said first and second GRIN lens are in physical contact.

16. The method of claim 1, wherein, in said converting step, said high-power optical signal is expanded from said first diameter to said second diameter.

17. The method of claim 1, wherein, in said converting step, said high-power optical signal is focused from said second diameter to said first diameter.

18. The method of claim 17, wherein said mating optical component is an active device.

19. A cable assembly for coupling an optical signal propagating in an optical fiber to a mating optical component, said optical signal having a first diameter while propagating in a mode field within said fiber, said cable assembly comprising:
a fiber;
a collimator fused to said fiber, said collimator converting said optical signal between said first diameter in said fiber and a second diameter, said second diameter being significantly greater than said first diameter, said collimator also having a first coupling surface for optically coupling with a second coupling surface of said mating component while said signal is at said second diameter; and
a blind mating backplane connector containing said collimator.

20. The cable assembly of claim 19, further comprising a ferrule containing said fiber and said collimator, said ferrule having a mating surface which presents said first coupling surface.

21. The cable assembly of claim 19, wherein said fiber and said collimator have essentially the same diameter.

22. The cable assembly of claim 21, wherein said coupling surface is flush with said mating surface and said mating surface and said coupling surface are polished for physical contact with said coupling surface of said mating optical component.

23. The cable assembly of claim 21, wherein said collimator comprises a lens optically coupled to said fiber and said coupling surface comprises an end surface of said lens.

24. The cable assembly of claim 23, wherein said backplane connector further comprises a ferrule having at least one borehole therethrough, said borehole containing said fiber and said lens mounted therein.

25. The cable assembly of claim 24, wherein said fiber is one of a plurality of fibers in a ribbon cable and said ferrule comprises a series of boreholes therethrough, said boreholes having a pitch corresponding to that of said fibers in said ribbon fiber.

26. The cable assembly of claim 25, wherein said ferrule is an MT-type ferrule.

27. The cable assembly of claim 19, wherein said collimator is a lens.

28. The cable assembly of claim 27, wherein said lens is fused to said end of said fiber.

29. The cable assembly of claim 28, wherein said lens has a diameter substantially the same as said fiber.

30. The cable assembly of claim 29, wherein said lens is a GRIN lens.

31. A cable assembly for coupling an optical signal propagating in an optical fiber to a mating optical component, said optical signal having a first diameter while propagating in a mode field within said fiber, said cable assembly comprising:
  a fiber;
  a collimator fused to said fiber, said collimator converting said optical signal between said first diameter in said fiber and a second diameter, said second diameter being significantly greater than said first diameter, said collimator also having a first coupling surface for optically coupling with a second coupling surface of said mating component while said signal is at said second diameter;
  wherein said fiber has a core and said core is fused to said collimator such that the center of said core is offset from the center of said collimator, and wherein said assembly further comprises a housing having a key relative to the radial position of the fiber and collimator, wherein said offset is perpendicular to said key.

32. A method of manufacturing a cable assembly, said method comprising:
  fusing a GRIN lens to an end of a fiber, said GRIN lens having essentially the same diameter as said fiber;
  inserting said fiber with said GRIN lens fused thereto into a ferrule borehole such that an end surface of said GRIN lens is substantially planar with an end face of said ferrule; and
  polishing said ferrule and said GRIN lens until the desired end face geometry and finish is achieved, wherein said GRIN lens is polished such that its length, from the end fiber to said ferrule surface is about ½ pitch+½n pitch, wherein n=0, 1, 2, 3 . . . 100 and said pitch is the median wavelength at which said cable assembly is intended to operate.

33. The method of claim 32, wherein said GRIN lens is polished to achieve a desired radius of curvature at its end face.

34. The method of claim 33, wherein said GRIN lens has a slant curvature at its end face.

35. The method of claim 32, wherein fusing said GRIN lens to said fiber required essentially no active alignment.

36. The method of claim 32, wherein fusing said GRIN lens to said fiber is performed using active alignment.

* * * * *